Figure 1:
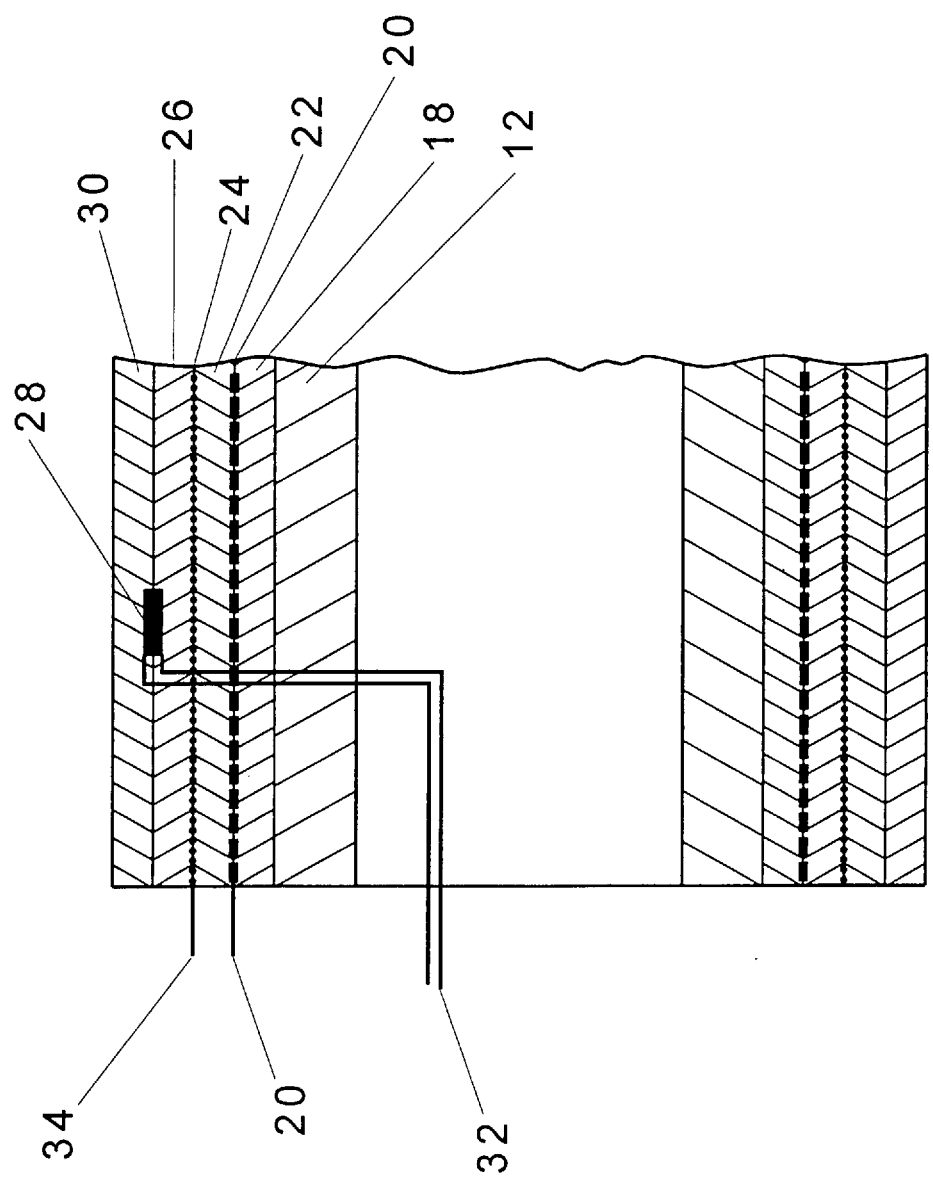

United States Patent
Berkan

[11] Patent Number: 5,885,410
[45] Date of Patent: Mar. 23, 1999

[54] HEATED LAMINATING ROLL

[76] Inventor: William A. Berkan, 1806 S. Hwy. 93, Hamilton, Mont. 59840

[21] Appl. No.: 900,798

[22] Filed: Jul. 25, 1997

[51] Int. Cl.⁶ ....................................................... B32B 1/08
[52] U.S. Cl. ........................ 156/582; 156/359; 156/583.1; 219/244; 492/46; 492/56
[58] Field of Search ..................................... 156/359, 555, 156/580, 582, 583.1; 492/9, 10, 46, 50, 53, 56; 219/244, 469, 470

[56] References Cited

U.S. PATENT DOCUMENTS

| | | | |
|---|---|---|---|
| 3,401,439 | 9/1968 | Staats et al. | 219/244 |
| 3,546,433 | 12/1970 | Johnson | 219/469 |
| 3,625,146 | 12/1971 | Hutchinson | 492/56 X |
| 3,720,808 | 3/1973 | Morrissey | 219/469 |
| 5,071,504 | 12/1991 | Singer | 156/301 |
| 5,081,340 | 1/1992 | Levitan | 219/469 |
| 5,312,662 | 5/1994 | Ohta et al. | 428/36.8 |
| 5,520,772 | 5/1996 | Levitan et al. | 156/358 |

Primary Examiner—James Sells
Attorney, Agent, or Firm—Jerry Johnson

[57] ABSTRACT

The heated laminating roll of the present invention comprises a cylindrical core having an exterior surface, an electrical resistance heating wire disposed on the exterior surface of the cylindrical core, and a silicone rubber cover disposed on the core. The silicone rubber cover provides the exterior surface of the roll. A metallic mesh is disposed within the silicone rubber cover. The metallic mesh is electrically insulated from the heating wire and is also electrically grounded. The metallic mesh layer is typically constructed of copper. The roll also may include temperature sensing devices disposed within the silicone rubber cover. The temperature sensing devices may also be disposed within the interior of the cylindrical core. The heated laminating roll provides the benefits of using an electrical resistance heater wire and additionally includes means to effectively conduct heat throughout the roll as well as providing means to safely shield the user from electrical shock.

6 Claims, 2 Drawing Sheets

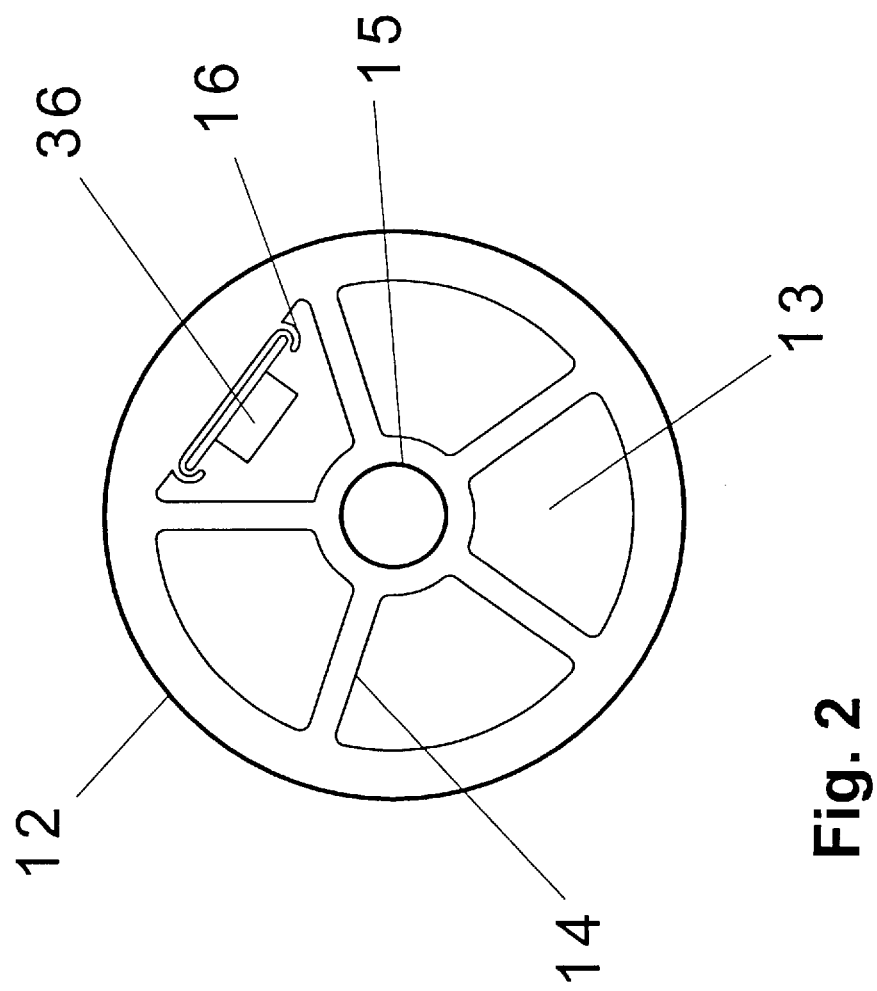

HEATED LAMINATING ROLL

BACKGROUND

Heated rolls are used in the laminating process where a thin protective thermoplastic film is applied to an article. The article to be laminated may include such things as paper documents and packaging for food stuffs.

The laminating process typically involves passing the article and the thermoplastic film through adjacent heated nip rolls which fuse the film directly to the article by the application of heat and pressure. Once the article has passed through the heated nip rolls, the thin protective thermoplastic film is essentially adhered to the article.

Most existing laminating machines use heated nip rolls that include a cylindrical core that has a silicone rubber cover. The heated nip rolls are typically heated internally through the use of heated liquids. The liquid may be heated internally within the roll through the use of heating elements. More commonly, the liquid is heated externally in a special heater.

Although heated nip rolls using heated liquid are generally effective at maintaining nip rolls at a constant temperature necessary for laminating, there are significant disadvantages to this technology.

A first disadvantage of using a heated liquid to heat laminating machine nip rolls is the length of time required to heat the liquid and thus the roll to operating temperature. This delay forces machines to be turned on well in advance of using the machine. Once the machine is at operating temperature the machine can not typically be shut down as the heat up time required would cause extensive delays.

Laminating roll heating systems of this type using a heated liquid as the means to heat the rolls are often used in work environments where the laminating machine is only used intermittently throughout the work day. A typical work environment where laminators are used is a copy or print shop. The laminating machine could be used for large production runs such as menus or for small jobs such as laminating a single document. Keeping a laminating machine at operating temperature all day to be able to perform small intermittent jobs adds a significant expense as the power requirements of keeping laminating machines of this type at operating temperature are quite high.

Another disadvantage of laminating machines that use a heated liquid to heat the nip rolls is the unsafe nature of hot liquids. Should a pressurized hose or cylinder rupture, the hot oil or glycol used in the heating the rolls would be likely to uncontrollably spray out of the system and inflict severe injuries and property damage.

Heated laminating rolls have previously been developed that use resistance wires to heat the laminating rolls. The resistance wires on these laminating rolls have been disposed on the core of the laminating roll underneath a covering of silicone rubber.

An advantage of using resistance heater wires is that resistance heater wires are much quicker at bringing a laminator roll to operating temperature than heated liquid systems. Because of this the laminating machine does not need to be maintained at operating temperature at all times. This feature saves considerable expense over heated liquid systems due to the decreased power usage. Laminating machines maintained at operating temperature often contribute a large amount of heat to work environments. This extra heat increases the cooling requirements of air conditioning equipment and the electrical power consumption expense associated therewith.

Laminating machines using resistance heater wires have fewer space requirements compared to a heated liquid system that has an external liquid heater. This feature also makes the laminating machines using resistance heater wires more easily accommodated into a work space.

Laminating machines using resistance heater wires to heat the laminating rolls also use a rolls that are considerably lighter in weight than the rolls used in heated liquid type machines. The extra weight of rolls using heated liquid requires that the entire laminating machine is also built of a heavy construction to properly support the heavy rolls. This extra weight also requires heavier drive mechanisms and heavier duty drive motors. Because of the overbuilt nature of heated liquid laminating machines the machines are less portable than resistance heater wire systems and are much more costly to manufacture.

In addition to the decreased materials required, laminating machines using resistance heater wires generally are also much simpler to manufacture compared to machines using heated liquid as a means to heat the rolls. This simplicity presents significant cost savings to the manufacturer. There are also corresponding savings to the operators of the laminating machines using resistance heater wires that are derived from a substantial decrease in the maintenance requirements of these laminating machines.

There are also safety benefits of using resistance heater wires to heat laminating rolls. There are no hot pressurized liquids that could inflict severe injuries or property damage if a component of the system ruptures. There is a significant decrease in safety inspections for resistance heater wire laminating machines as the machines do not use pressurized heated liquids.

Although there are significant benefits to using resistance heater wires as a means to heat rolls in laminating machines, there have also been two significant disadvantages that were not overcome by the prior art.

A first disadvantage of laminating rolls using resistance heater wires is due to the uneven application of heat to the rolls by the resistance wire. Attempts at conducting heat evenly to the rolls in previous systems have comprised the impregnation of the silicone rubber roll covering with copper particles or the use of metallic compounds electro-sprayed over the resistance wires. Impregnating silicone rubber with copper particles provided an increase in the heat conductivity of the silicone rubber and a more even heat distribution on the rolls. In this way the disadvantage of uneven heat distribution was overcome with this design. However, this system was unsuccessful because mixing copper particles into silicone greatly restricts the methods of applying silicone to the core of a laminating roll during the manufacturing process. Additionally, the silicone is difficult to machine to a necessary surface finish due to the inclusion of copper particles which cause excessive tearing and pitting at the outer machined surface of the silicone. As a very smooth surface finish is required for high quality laminating the process proved to be undesirable.

Electro-spraying laminating rolls with copper to increase the heat conductivity has also proven to be unsuccessful as the additional manufacturing costs are prohibitive. Furthermore, metallic coatings produced by electro-spraying are quite brittle and do not hold up well to the rigors of pressure and temperature shock that effect laminating rolls.

An additional problem with the prior art laminating rolls using electrical resistance heater wires has been the safety risk associated with working around live electrical wires that are covered only with the silicone rubber covering on the roll. The risk with this system is due to the sharp tools often used in conjunction with laminating machines. These tools may penetrate into the silicone where the tool may contact a live resistance wire causing injury to the user.

For the foregoing reasons there is a need for a heated laminating roll that utilizes the substantial benefits provided by electrical resistance heater wires but additionally provides a means to conduct the heat uniformly throughout the roll. There is also a need for a heated laminating roll that provides a safety mechanism to ensure that a user of the laminating machine cannot come in contact with a live electrical resistance wire.

SUMMARY

The present invention satisfies the previously mentioned need for a heated laminator roll that uses electrical resistance heater wire and additionally includes means to conduct heat throughout the roll as well as providing means to safely shield the user from electrical shock.

The heated laminating roll of the present invention comprises a cylindrical core having an exterior surface, an electrical resistance heating wire disposed on the exterior surface of the cylindrical core, and a silicone rubber cover disposed on the core. The silicone rubber cover provides the exterior surface of the roll and also includes a metallic mesh. The metallic mesh is electrically insulated from the heating wire and is also electrically grounded.

The metallic mesh layer is typically constructed of copper. The roll typically includes temperature sensing devices disposed within the silicone rubber cover. The temperature sensing devices may also be disposed within the interior of the cylindrical core.

The heated laminator roll of the present invention provides the known advantage of short heat up times that are associated with using electrical resistance wires as the heat source for the heated laminator roll. The heated laminator roll additionally provides the benefit of increased safety over heated laminator rolls using heated pressurized liquids as the means to heat the laminator rolls.

The heated laminator roll also provides benefits that have previously been unavailable to users of laminating machines.

The inclusion of copper mesh into the silicone rubber coating on the laminator roll provides the benefit of increased thermal conductivity to the laminator roll. The increased thermal conductivity provided by copper mesh ensures that the heat applied to the laminating film is uniform which ensures a high quality lamination. The increased thermal conductivity also minimizes the thermal damage to the roll by ensuring that the temperature is uniform throughout the roll. There are no hot spots that could damage the roll.

Unlike the prior art use of copper particles to assist in thermal conductivity the use of copper mesh does not inhibit the manufacturing process used to construct the rolls. Silicone may be purchased in thin sheets that are used to build up the roll. Inserting a layer of copper mesh into the silicone cover is easily performed as the silicone cover is most easily manufactured by applying sheets of silicone layer by layer onto the roll core.

The copper mesh also does not inhibit the machining of the silicone layer to a proper surface finish as the copper is beneath the surface of the silicone being machined. This is a substantial improvement over the use of copper particles.

Another feature of the heated laminating roll of the present invention is the addition of a ground connection to the copper mesh to effectively electrically isolate the user from the live electrical resistance heating wires. This feature provides safety benefits that were previously unavailable to operators of laminating machines.

Although the electrical resistance heating wires are maintained proximate to the roll core and are covered with a layer of silicone, there remains risks to the laminating machine operators. Laminating machine operators are often using sharp cutting utensils close to the rolls to either cut the laminating film at a desired location or remove film that may have become stuck on the roll. Should the sharp cutting utensil penetrate into the silicone covering of the laminating roll of the present invention the utensil will first penetrate through the grounded copper mesh before contacting the live electrical resistance wires. The grounded mesh in this way protects the user against electrical shock. In schools or offices where many inexperienced users may operate a laminating machine the safety mechanism adds a level of protection that has previously been unavailable.

The heated laminating roll of the present invention also includes the additional feature of a mounting location on the core of the roll within which thermal sensing switches may be located. This feature provides the additional benefit of locating the thermal sensing switch at a location where installation would be much simpler than within the silicone covering on the roll. A thermal sensing switch installed at this location would properly shut off current to the electrical resistance wires when a certain temperature is reached at the sensor.

Alternatively, a thermal sensing cut off switch could be mounted at this location to safeguard the roll against destructively high temperatures should thermal sensors mounted within the silicone covering fail to properly signal to turn off current to the electrical resistance wires. A roll using thermal sensors mounted within the silicone covering would not need to be scrapped should the sensors fail as a sensor within the core could be mounted as a replacement.

These and other advantages of the present invention will become apparent upon inspection of the accompanying specification, claims and drawings.

DRAWINGS

FIG. 1. shows a cross-sectional partial front view of a version of the heated laminating roll of the present invention.

FIG. 2 shows a side view of the core configuration of a version of the present invention.

DESCRIPTION

Referring to the drawings, FIG. 1. shows a cross-sectional partial front view of a version of the heated laminating roll of the present invention. FIG. 2 shows a side view of the core configuration of a version of the present invention.

In greater detail FIG. 1 shows a heated laminating roll comprising an extruded aluminum core 12. Disposed on the exterior surface of the core is a silicone cover that includes a first silicone rubber layer 18 that may typically comprise a layer of silicone only or a sandwich layer of silicone, fiberglass, and silicone. Disposed on top of layer 18 is a electrical resistance wire 20 that is typically a ribbon. A second silicone layer 22 is disposed on the roll. This layer 22 may also comprise a layer of silicone only or a sandwich layer of silicone, fiberglass, and silicone. A metallic mesh layer 24 which is typically copper is disposed on silicone layer 22. A layer of silicone 26 is disposed on the copper mesh layer 24. Temperature sensors 28 may typically be disposed on silicone layer 26. An external silicone layer 30 provides the exterior surface for the roll. FIG. 1 also shows an electrical ground wire 34 connected to the copper mesh and electrical wires 32 connected to the temperature sensor 28.

FIG. 2 is a side view of a preferred version of the core 12 of the laminating roll of the present invention showing the internal configuration of the core 12. Core 12 is typically and aluminum extrusion and includes a plurality of through passages 13 separated by webs 14. A mounting hole 15 for a shaft or journal, upon which the roll would turn, is located in the middle of the core. Disposed within core 12 is a mounting location 16 for a temperature sensor or emergency shut off switch 36 that is also shown disposed within the mounting location. The mounting location comprises opposing channels of an appropriate size to accommodate a temperature sensor or emergency shut off switch. It is understood that the hollow core construction shown in FIG. 1 could be replaced with the core configuration of FIG. 2.

The heated laminating roll of the present invention is typically constructed by first laying a layer of silicone 18 which may comprise silicone only or a sandwich layer of silicone, fiberglass, and silicone onto the core. Silicone of this type used in constructing the roll cover of the present invention is in the form of calendared sheets that are easily lain onto the core. A sandwich layer of silicone, fiberglass, and silicone would also be in a sheet form. Once silicone layer 18 is lain onto the core the electrical resistance heater wire 20 is wound on top of layer 18. This heater wire 20 may be disposed at various densities on top of layer 18 with the electrical resistance wire typically covering between 45 and 60 percent of the length of the roll. If a core material that is not electrically conductive is used the electrical resistance wire could be disposed directly onto the core without a layer of silicone separating the wire from the core to electrically insulate the wire from the core. Electrical resistance wire 20 is shown passing out of the roll at the end of the roll. In an alternative version, wire 20 would exit through the core 12 into the core interior from where it would exit the core. Electrical resistance wire would typically be attached at both ends of the roll to an electrical source by brushes, slip rings, or other suitable means that allow an electrical current to be applied to a rotating roll.

A second silicone layer 22 which also may comprise silicone in sheet form or a sandwich layer or silicone, fiberglass, and silicone in sheet form is lain onto the core covering silicone layer 18 and resistance wire 20. Fiberglass prevents the heated electrical resistance wire from melting through the opposing silicone layers when the electrical resistance wire is hot.

A metallic mesh layer 24, which is typically copper mesh, is then lain onto silicone layer 22. This copper mesh layer typically is a screen constructed of a small gauge copper wire. The copper provides a very high thermal conductivity to evenly transfer heat throughout the roll. The copper mesh allows opposing layers of silicone to remain substantially in contact with each other. This feature keeps the silicone cover as homogeneous as is possible and minimizes the chance the silicone cover will separate in use.

A ground connection electrical wire 34 is attached to the copper mesh layer 24. Ground connection wire 34 is shown attached to the mesh layer 24 and is also shown exiting the end of the roll. The ground connection wire could of course exit from the interior of the roll in an alternative arrangement. This ground connection would be attached to the laminating machine frame by a suitable connection such as a brush or slip rings and would typically be grounded to the frame at both ends of the roll.

A silicone layer 26 is lain onto the copper mesh layer 24. On top of this layer one or more temperature sensors 28 are disposed. Temperature sensor 28 is shown with attached electrical wires 32 that in an this version pass through the core 12 into the core interior from where they exit the roll. In an alternative version the wires 32 could pass out the end of the roll. Temperature sensors would provide an accurate measurement of the temperature proximate to the roll surface and relay this measurement to switching devices which control the application of current to resistance heater wire 20.

An outer layer of silicone 30 is typically the final layer that is lain onto the roll. This outer silicone layer 30 covers the silicone layer 26 and temperature sensors 28. Once this layer is applied to the roll the silicone is cured if necessary, and the roll is then ground or machined to a round condition with a high quality surface finish. A high quality surface finish is required so that the roll evenly applies pressure during the lamination process. This ensures that the laminating film that is laminated to an article is free from any imperfections.

Additional temperature sensors or an emergency electrical shut off switch could at this point be installed within the mounting slot 16. The mounting slot 16 would be typically be disposed near an end of the roll core where access would be easy. A temperature sensor or an emergency shut off switch 36 installed within the mounting slot could be wired in series with the electrical resistance wire.

The heated laminating roll of the present invention is highly effective in use. Once electricity is applied to the electrical resistance wire 20, the laminating roll quickly heats up to a proper operating temperature. The copper mesh assists the silicone in conducting heat evenly throughout the roll. Once the roll is at the desired operating temperature, the temperature sensors send a signal to the power source to discontinue power to the electrical resistance wires. The temperature sensors may be disposed as shown at 28 on FIG. 1 or if a less expensive version is desired, installed within the mounting slot 32. Temperature sensors would send a signal to the power source when the temperature was below a desired operational temperature. The power source would then commence the application of power to the resistance wire again. This process would continue as long as the laminating machine is turned on.

A laminating machine using the heated laminating roll of the present invention could be turned off immediately after use as it does not need to be maintained in a operating temperature. The roll can be quickly brought back up to temperature when the use of the machine is required.

Should the temperature sensors 28 malfunction, an emergency shut off switch 36 would typically shut off the current to the electrical resistance wire. This safety mechanism would prevent a catastrophic overheating of the roll.

Although only a single roll is shown, the typical arrangement in a laminating machine would be two heated laminating rolls mounted adjacent to each other with a nip created between the outer surface of both rolls. Laminating film would be fed through the nip at the same time that an article is passed through the nip. If two layers of film are used the film will encapsulate the article. If a single layer of film is used the article will be coated on one surface with the laminating film.

The laminating process often involves sharp instruments to cut the laminating film or articles, or to remove laminating film from the rolls. Should a sharp object accidently penetrate into the roll silicone covering, the object will cut through the grounded copper mesh before touching the live electrical resistance wire. This feature ensures that no severe injuries from electrical shock will occur.

Although a preferred version of the laminating roll of the present invention has been shown in FIGS. 1 and 2 and herein described, it is understood that modifications in form or detail could be made without departing from the spirit of the invention. It is therefore intended that the invention be not limited to the exact form and detail herein shown and described, nor to anything less than the whole of the invention herein disclosed and as claimed.

Examples of modifications that may be made include the repositioning of the copper mesh and the temperature sensors within the silicone cover. The mesh and the sensors would necessarily be maintained in position which is electrically isolated from the electrical resistance wires but could be disposed within the silicone cover at various positions within the silicone cover. The electrical resistance heater wire could comprise a solid wire or a electrical ribbon. The electrical resistance wire could also be disposed on the surface of the core.

I claim:
1. A heated laminating roll comprising:

a cylindrical core having an exterior surface;

an electrical resistance heating wire disposed on the cylindrical core proximate to the exterior surface of the cylindrical core;

a silicone rubber cover disposed on the core; wherein the silicone rubber cover provides the exterior surface of the roll;

a metallic mesh disposed within the silicone rubber cover; wherein the metallic mesh is electrically insulated from the heating wire and wherein the metallic mesh is electrically grounded.

2. The heated laminating roll of claim 1, wherein the metallic mesh layer is constructed of copper.

3. The heated laminating roll of claim 1, wherein the electrical resistance wire is disposed within the silicone rubber cover.

4. The heated laminating roll of claim 1, wherein the roll additionally includes temperature sensing devices.

5. The heated laminating roll of claim 4, wherein the temperature sensing devices are disposed within the silicone rubber cover.

6. The heated laminating roll of claim 4, wherein the temperature sensing devices are disposed within the interior of the cylindrical core.

* * * * *